(12) United States Patent
Chen

(10) Patent No.: US 6,385,242 B1
(45) Date of Patent: May 7, 2002

(54) METHOD AND APPARATUS FOR INVERSE QUANTIZATION OF MPEG-4 VIDEO

(75) Inventor: Xuemin Chen, San Diego, CA (US)

(73) Assignee: General Instrument Corporation, Horsham, PA (US)

(*) Notice: Subject to any disclaimer, the term of this patent is extended or adjusted under 35 U.S.C. 154(b) by 5 days.

(21) Appl. No.: 09/689,070

(22) Filed: Oct. 12, 2000

Related U.S. Application Data

(63) Continuation of application No. PCT/US99/09088, filed on Apr. 27, 1999.
(60) Provisional application No. 60/084,025, filed on May 4, 1998.

(51) Int. Cl.[7] .................................................. H04N 7/12
(52) U.S. Cl. .................................. 375/240.03; 382/253
(58) Field of Search ........................ 375/240.03, 240.22, 375/240.02, 240.12, 240.18; 348/404.1, 424.2; 382/238, 239, 248, 251, 253; H04N 7/12

(56) References Cited

U.S. PATENT DOCUMENTS

| | | | |
|---|---|---|---|
| 5,617,094 A | | 4/1997 | Kim |
| 6,125,142 A | * | 9/2000 | Han .................. 375/240.1 |
| 6,208,693 B1 | * | 3/2001 | Chen et al. ......... 375/240.23 |
| 6,307,885 B1 | * | 10/2001 | Moon et al. ......... 375/240.08 |
| 2001/0012324 A1 | * | 8/2001 | Normile .............. 375/240.05 |

FOREIGN PATENT DOCUMENTS

| | | |
|---|---|---|
| EP | 0 714 212 | 5/1996 |

* cited by examiner

*Primary Examiner*—Nhon T Diep
(74) *Attorney, Agent, or Firm*—Barry R. Lipsitz

(57) ABSTRACT

Inverse quantization (36, 44, 60) of a two-dimensional array of video coefficients QF[v][u] is provided. A first weighting matrix $\bar{W}[0][v][u]=2*W[0][v][u]$ for intra-coded macroblocks and a second weighting matrix $\bar{W}[1][v][u]=2*W[1][v][u]$ for non-intra-coded macroblocks are pre-computed and stored (88). A quantization difference ($quant_{i+1}$) to be used in selecting a weight factor is computed (70) based on a current macroblock quantization level. The weight factor is output from one of the weighting matrices in response to the quantization difference and a macroblock type identifier (66) (i.e., intra-coded or non-intra-coded). Subsequent weights $W_{i+1}[w][v][u]$ are then computed (86) from a current weight $W_i[w][v][u]$ and the weight factor. The array of coefficients QF[v][u] is multiplied (92) by the weights $W_{i+1}[w][v][u]$ to reconstruct unquantized coefficients.

13 Claims, 4 Drawing Sheets

METHOD AND APPARATUS FOR INVERSE QUANTIZATION OF MPEG-4 VIDEO

This application is a continuation of international application No. PCT/US99/09088 filed Apr. 27, 1999.

This application claims the benefit of U.S. Provisional Application No. 60/084,025, filed May 4, 1998.

BACKGROUND OF THE INVENTION

The present invention relates to a method and apparatus for inverse quantization of video data provided in accordance with the MPEG-4 standard, and, in particular, to inverse quantization in a video texture decoding process.

The invention is particularly suitable for use with various multimedia applications, and is compatible with the MPEG-4 Verification Model (VM) standard described in document ISO/IEC 14496-2, ISO/IEC JTC1/SC29/WG11 N1902, entitled "Coding of Audio-Visual Objects: Visual", Oct. 30, 1997, incorporated herein by reference. The MPEG-2 standard is a precursor to the MPEG-4 standard, and is described in document ISO/IEC 13818-2, entitled "Information Technology—Generic Coding of Moving Pictures and Associated Audio, Recommendation H.262," Mar. 25, 1994, incorporated herein by reference. Further details on the MPEG-4 standard can be found in T. Sikora, "The MPEG-4 Video Standard Verification Model," *IEEE Transactions on Circuits and Systems for Video Technology,* Vol. 7, No. 1, February 1997, pp. 19–31.

MPEG-4 is a new coding standard which provides a flexible framework and an open set of coding tools for communication, access, and manipulation of digital audio-visual data. These tools support a wide range of features. The flexible framework of MPEG-4 supports various combinations of coding tools and their corresponding functionalities for applications required by the computer, telecommunication, and entertainment (i.e., TV and film) industries, such as database browsing, information retrieval, and interactive communications.

MPEG-4 provides standardized core technologies allowing efficient storage, transmission and manipulation of video data in multimedia environments. Moreover, systems complying with the MPEG-4 standard achieve efficient compression, object scalability, spatial and temporal scalability, and error resilience.

The MPEG-4 video VM coder/decoder (codec) is a block- and object-based hybrid coder with motion compensation. Texture is encoded with an 8×8 Discrete Cosine Transformation (DCT) utilizing macroblock-based motion compensation. Object shapes are represented as alpha maps and encoded using a Content-based Arithmetic Encoding (CAE) algorithm or a modified DCT coder, both using temporal prediction. The coder can handle sprites as they are known from computer graphics. Other coding methods, such as wavelet and sprite coding, may also be used for special applications.

Motion compensated texture coding is a well known approach for video coding, and can be modeled as a three-stage process. The first stage is signal processing which includes motion estimation and compensation (ME/MC) and a two-dimensional (2-D) spatial transformation. The objective of ME/MC and the spatial transformation is to take advantage of temporal and spatial correlations in a video sequence to optimize the rate-distortion performance of quantization and entropy coding under a complexity constraint. The most common technique for ME/MC has been block matching, and the most common spatial transformation has been the DCT.

Inverse quantization is an important step in the video texture decoding process. There are two quantization methods specified in MPEG-4 video. The first method is the MPEG-2 quantization method, and the second method is the H.263 quantization method set forth in ITU-T Group for Line Transmission of Non-Telephone Signals, "Draft recommendation H.263—Video coding for low bitrate communication," December, 1995. The DC coefficients of intra-coded blocks are inverse-quantized differently than all other coefficients when the MPEG-2 quantization method is used. This has led to complexity in attempting to design an inverse quantizer for MPEG-4 video.

Accordingly, it would be desirable to have an efficient and simple technique for inverse quantization when processing MPEG-4 video. The present invention provides an apparatus and method having the above and other advantages.

SUMMARY OF THE INVENTION

In accordance with the invention, a two-dimensional array of quantized coefficients QF[v][u] to be inverse quantized is provided. A first weighting matrix $\overline{W}[0][v][u]=2*W[0][v][u]$ for intra-coded macroblocks represented by said coefficients is pre-computed and stored. A second weighting matrix $\overline{W}[1][v][u]=2*W[1][v][u]$ for non-intra-coded macroblocks represented by said coefficients is pre-computed and stored. A quantization difference to be used in selecting a weight factor is computed based on a current macroblock quantization level. The weight factor is provided from one of the stored first and second weighting matrices in response to the quantization difference and a macroblock type identifier. Subsequent weights $W_{i+1}[w][v][u]$ are then computed from a current weight $W_i[w][v][u]$ and the weight factor.

In an illustrated embodiment, the array of coefficients QF[v][u] is multiplied by the weights $W_{i+1}[w][v][u]$ to reconstruct unquantized coefficients. Moreover, in the illustrated embodiment, the coefficients represent macroblocks of a video object plane (VOP).

The quantization difference can be computed by subtracting a first quantizer scale (quantizer_scale$_i$) from a second, subsequent quantizer scale (quantizer_scale$_{i+1}$).

Apparatus is provided in accordance with the invention for inverse quantizing a two-dimensional array of quantized coefficients QF[v][u]. A pre-computed first weighting matrix $\overline{W}[0][v][u]=2*W[0][v][u]$ is stored in a memory for intra-coded macroblocks represented by the coefficients. A pre-computed second weighting matrix $\overline{W}[1][v][u]=2*W[1][v][u]$ for non-intra-coded macroblocks represented by said coefficients is also stored. A first adder computes a quantization difference to be used in selecting a weight factor based on a current macroblock quantization level. The weight factor is output from the first or second weighting matrix in response to the quantization difference and a macroblock type identifier that specifies either an intra-coded block or a non-intra-coded block. A second adder iteratively computes subsequent weights $W_{i+1}[w][v][u]$ from a current weight $W_i[w][v][u]$ and the weight factor.

A multiplier can be provided for multiplying the array of coefficients QF[v][u] by the weights $W_{i+1}[w][v][u]$ in order to reconstruct unquantized coefficients. In an illustrated embodiment, the coefficients represent macroblocks of a video object plane (VOP).

The pre-computed first and second weighting matrices can be stored, e.g., in a first random access memory (RAM) addressed by the quantization difference and the macroblock type identifier. An initial weight $W_0[w][v][u]$ for each VOP can be stored in a second RAM and provided to the second adder as $W_r[w][v][u]$ via a delay. The second RAM is addressed by an initial quantization level (Vop_quant) of each VOP and the macroblock type identifier. A switch can be provided to couple the initial weight $W_0[w][v][u]$ for each VOP from the second RAM to the delay at the commencement of each new VOP.

DETAILED DESCRIPTION OF THE INVENTION

An MPEG-4 video decoder is primarily composed of three parts. These are a shape decoder, a motion decoder and a texture decoder. A reconstructed video object plane (VOP) is obtained by combining the decoded shape, texture and motion information, as illustrated in the block diagram of FIG. 1. See also, Committee Draft, "Coding of audio-visual objects: visual", ISO/IEC 14496-2, ISO/IEC JTC1/SC29/WG11 N1902, Oct. 30, 1997.

Figure 1:
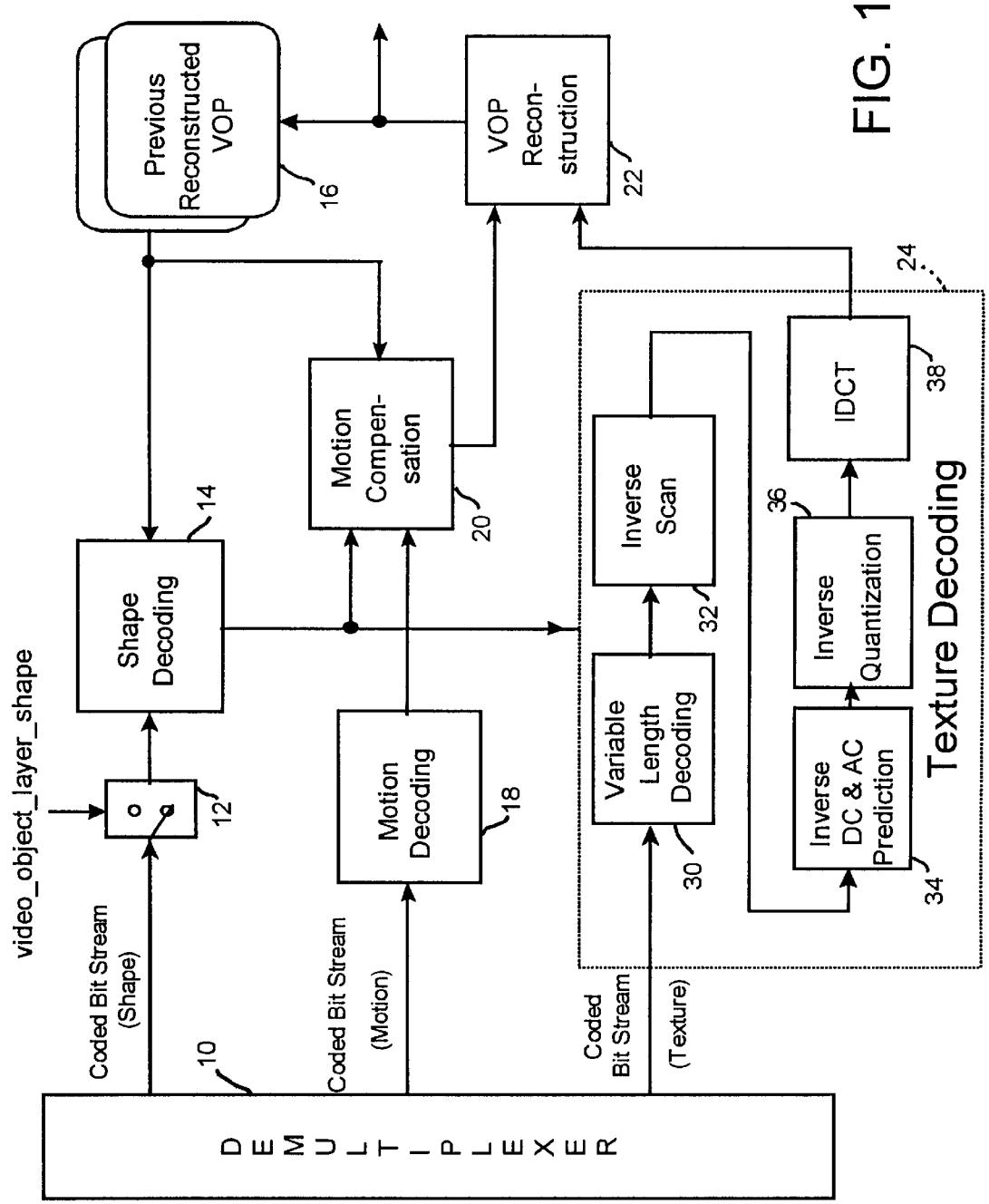
FIG. 1 is a block diagram illustrating the MPEG-4 video decoding process.

FIG. 1 illustrates a video decoder in which a demultiplexer 10 provides coded bit streams indicative of shape, motion and texture from an input MPEG-4 video stream (not shown). The shape information is input to a switch 12 that selectively passes the information to a shape decoding function 14 in response to a video_object_layer_shape control signal. When shape information is not to be decoded, switch 12 disconnects the coded bit stream containing the shape information from the shape decoding function.

The coded bit stream that contains motion information is decoded by a motion decoding function 18. A motion compensation function 20 uses the decoded shape and motion information from functions 14, 18 respectively to provide a motion compensation difference signal to a video object plane (VOP) reconstruction function 22. VOP function 22 also receives decoded texture information from a texture decoding function generally designated 24.

The texture decoding function decodes the texture information of a VOP. This texture information is provided in the coded bit stream (texture) from demultiplexer 10, and is variable length decoded by variable length decoding function 30. The variable length decoded data is inverse scanned by an inverse scanning function 32, and passed to an inverse DC & AC prediction function 34. The resultant data is inverse quantized in an inverse quantizer 36. An inverse discrete cosine transform (IDCT) is then performed by IDCT function 38, and the resultant texture decoded data are provided to the VOP reconstruction function 22.

Reconstructed VOPs are stored as previous reconstructed VOPs as indicated at box 16, for subsequent use by the motion compensation function 20 and shape decoding function 14 in a conventional manner. These previous VOPs are necessary in order to decode current VOPs that are received in a compressed form without all of the information that comprises the VOP. The reconstructed VOPs are also output from the process of FIG. 1 for use by subsequent video processes as well known in the art.

Figure 2:
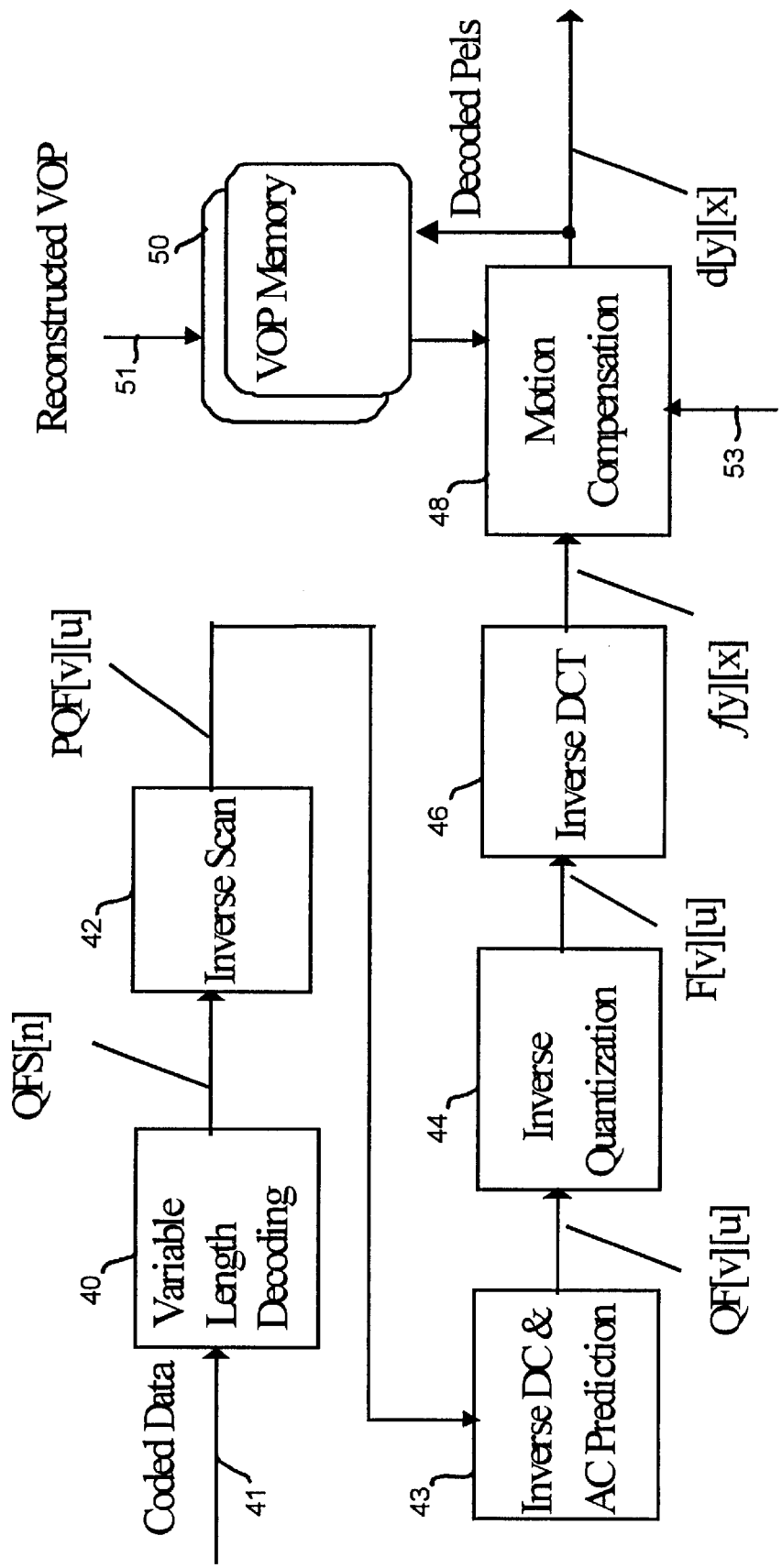
FIG. 2 is a block diagram illustrating the video texture decoding process of FIG. 1 in greater detail.

FIG. 2 illustrates the decoding process for video texture information. In FIG. 2, two dimensional arrays are represented as name[q][p] where 'q' is the index in the vertical dimension and 'p' the index in the horizontal dimension.

The coded bit stream (texture) is provided via line 41 to variable length decoding function 40, which outputs the variable length decoded data QFS[n]. This decoded data is then inverse scanned by an inverse scan function 42. Scanning, such as zig-zag scanning of DCT coefficients and the complementary inverse scanning thereof is well known in the art. Also well known are algorithms and circuits for performing such scanning and inverse scanning of blocks of coefficients.

The data that has been inverse scanned is then provided to an inverse DC and AC prediction function 43. The resultant data QF[v][u] is inverse quantized by inverse quantization function 44 to produce F[v][u]. An inverse DCT function 46 provides f[y][x] from F[v][u]. This data is then passed on to a motion compensation function 48 that receives the necessary motion vectors via line 53. The resultant decoded pels d[y][x] are stored in a VOP memory 50, which also receives reconstructed VOPs via line 51. It is noted that functions 40, 42, 43, 44 and 46 of FIG. 2 correspond generally to functions 30, 32, 34, 36 and 38 of FIG. 1.

The inverse quantization provided by function 44 is an important step in the video texture decoding process. In particular, the two-dimensional array of coefficients, QF[v][u], is inverse quantized to produce the reconstructed DCT coefficients f[y][x]. This process is essentially a multiplication by the quantizer step size. The quantizer step size is modified by two mechanisms; a weighting matrix is used to modify the step size within a block and a scale factor is used in order that the step size can be modified at the cost of only a few bits (as compared to encoding an entire new weighting matrix).

Figure 3:
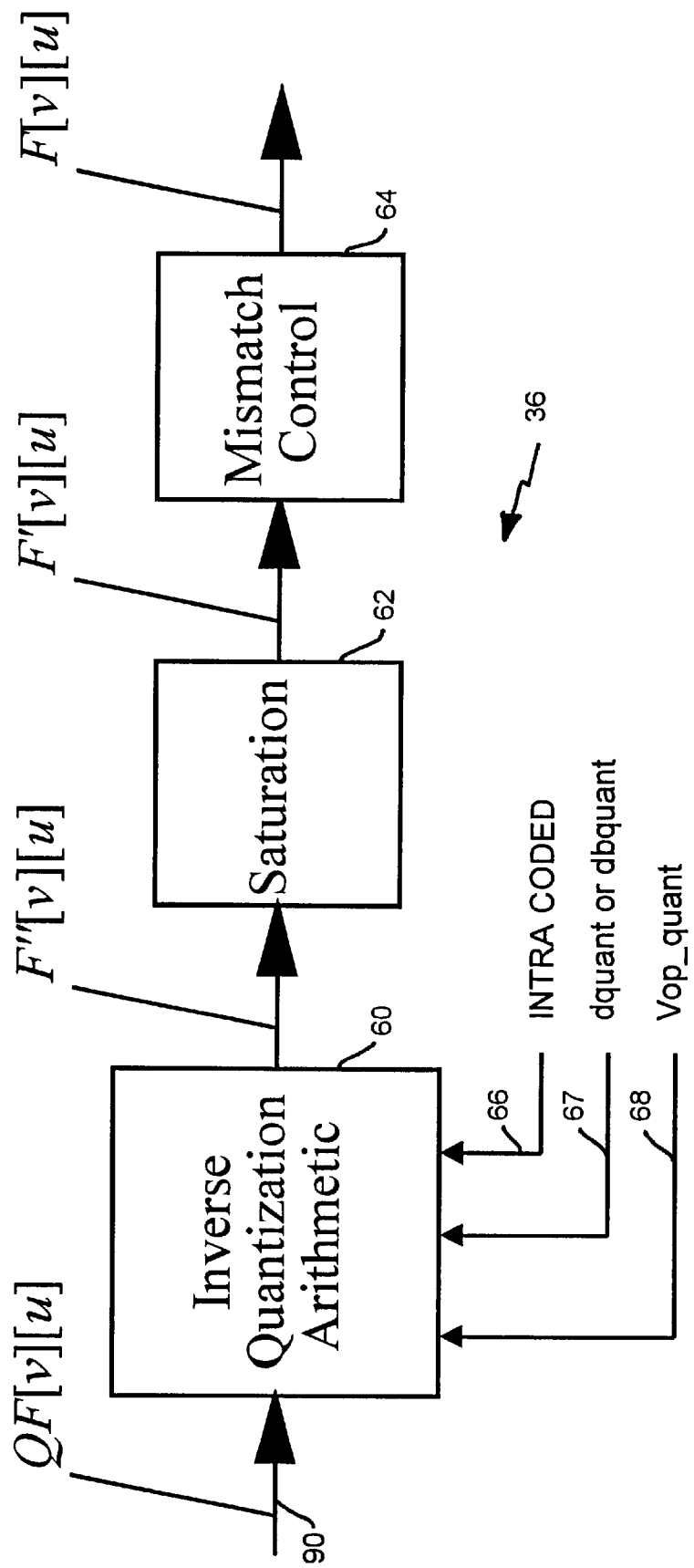
FIG. 3 is a block diagram illustrating the inverse quantization process of FIGS. 1 and 2 in greater detail.

FIG. 3 illustrates the overall inverse quantization process. The two-dimensional array of coefficients, QF[v][u] is input via line 90 to an inverse quantization arithmetic function 60. After the appropriate inverse quantization arithmetic is performed, the resulting coefficients, F"[v][u], are saturated (i.e., clipped with respect to an upper and lower boundary) by saturation function 62 to yield F'[v][u]. For example, the saturation may implement an upper bound of 257 and a lower bound of 258. If F"[v][u] is smaller than −258, it will be truncated to −258. If F"[v][u] is larger than 257, it will be truncated to 257. Such a saturation function can be implemented using a comparator or the like as well known in the art.

After saturation, a mismatch control operation 64 is performed. Mismatch control is described in ISO/IEC 14496-2 referred to hereinabove and is well known to those skilled in the art. In general, mismatch control is performed by summing all of the reconstructed, saturated coefficients, F'[v][u]. The sum is then tested to determine whether it is odd or even. If the sum is even, then a correction is made to just one coefficient, namely, F[7][7]. The correction to F[7][7] may be simply implemented by toggling the least significant bit of the twos complement representation of the coefficient. Also, since only the "oddness" or "evenness" of the sum is of interest, an exclusive OR (of just the least significant bit) may be used to calculate the sum. Th final reconstructed DCT coefficients, F[v][u], are output from the mismatch control 64.

There are two quantization methods specified in MPEG-4 video. The first method is the MPEG-2 quantization method. The second one is the H.263 quantization method.

For the MPEG-2 quantization method, the DC coefficients of intra-coded blocks are inverse-quantized in a different manner than all other coefficients. In intra-coded blocks, F"[0][0] are obtained by multiplying QF[0][0] by a constant multiplier. The reconstructed DC values are computed as follows:

$$F''[0][0] = dc\_scaler * QF[0][0].$$

For intra-coded macroblocks, an optimized nonlinear inverse DC quantization is used to determine the scalar factor dc_scaler. Within an intra-coded macroblock, luminance blocks are called type 1 blocks, and chroma blocks are classified as type 2 blocks.

DC coefficients of Type 1 blocks are quantized by Nonlinear Scaler for Type 1

DC coefficients of Type 2 blocks are quantized by Nonlinear Scaler for Type 2

Table 1 specifies the nonlinear dc_scaler expressed in terms of piece-wise linear characteristics.

TABLE 1

| Component: Type | dc_scaler for quantizer_scale range | | | |
|---|---|---|---|---|
| | 1 thru 4 | 5 thru 8 | 9 thru 24 | 25 thru 31 |
| Luminance: Type 1 | 8 | 2x quantizer_scale | quantizer_scale +8 | 2 x quantizer_scale −16 |
| Chrominance: Type 2 | 8 | (quantizer_scale +13)/2 | | quantizer_scale −6 |

For the MPEG-2 quantization method, all coefficients other than the intra DC coefficient are inverse-quantized using two weighting matrices in accordance with the present invention. One is for intra-coded macroblocks and the other is for non-intra-coded macroblocks. Each matrix has a default set of values which can be overwritten by downloading a user defined matrix. Let the weighting matrices be denoted by W[w][v][u] where w takes the values 0 to 1 indicating which of the matrices is being used. W[0][v][u] is for intra-coded macroblocks, and W[1][v][u] is for non-intra-coded macroblocks.

The following equation specifies the arithmetic used to reconstruct F"[v][u] from QF[v][u] (for all coefficients except intra DC coefficients):

$$F''[v][u] = ((2 \times QF[v][u] + k) \times W[w][v][u] \times quantiser\_scale)/32$$

where:

$$k = \begin{cases} 0 & \text{intra blocks} \\ Sign(QF[v][u]) & \text{non-intra blocks} \end{cases}$$

and where "/" denotes integer division with truncation of the result toward zero. In summary, this inverse quantization process is any process numerically equivalent to:

```
for (v = 0; v < 8; v++) {
    for (u = 0; u < 8; u++) {
        if (QF[v][u] == 0)
            F"[v][u] = 0;
        else if ((u == 0) && (v == 0) && (macroblock_intra)) {
            F"[v][u] = dc_scaler * QF[v][u];
        } else {
            if (macroblock_intra) {
                F"[v][u] = (QF[v][u] * W[0][v][u] * quantizer_scale *
                    2)/32;
            } else {
                F"[v][u] = (((QF[v][u] * 2) + Sign(QF[v][u])) *
                    W[l][v][u]
                    * quantizer_scale)/
                    32;
            }
        }
    }
}
```

When the quantizer_scale changes from the i-th macroblock to the (i+1)-th macroblock (i≧0), it is specified by:

quantizer_scale$_{i+1}$=clip(quantizer_scale$_i$+dquant$_{i+1}$) for I- and P-VOPs, and quantizer_scale$_{i+1}$=clip(quantizer_scale$_i$+dbquant$_{i+1}$) for B-VOPs.

The function clip makes sure the value of quantizer_scale is between 1 and 31.

The dquant and dbquant terms are specified as follows:

dquant—This is a 2-bit code which specifies the change in the quantizer, quant, for I- and P-VOPs.

Table 2 lists the codes and the differential values they represent. The value of quant lies in range of 1 to 31; if the value of quant after adding the dquant value is less than 1 or exceeds 31, it shall be correspondingly clipped to 1 and 31.

TABLE 2

(dquant codes and corresponding values)

| dquant code | value |
|---|---|
| 00 | −1 |
| 01 | −2 |
| 10 | 1 |
| 11 | 2 | dbquant—This is a variable length code which specifies the change in quantizer for B-VOPs.

Table 3 lists the codes and the differential values they represent. If the value of quant after adding the dbquant value is less than 1 or exceeds 31, it shall be correspondingly clipped to 1 and 31.

TABLE 3

(dbquant codes and corresponding values)

| dbquant code | value |
|---|---|
| 10 | −2 |
| 0 | 0 |
| 11 | 2 |

It is noted that the values of dquant can only be −2, −1, 1, 2 while the values of dbquant can only be −2, 0, 2. The present invention takes advantage of this realization to simplify the computation of the inverse quantization process using the following two steps:

(1) Pre-compute and store two additional weighting matrices $\overline{W}[0][v][u]=2*W[0][v][u]$ for intra-coded macroblocks and $\overline{W}[1][v][u]=2*W[1][v][u]$ for non-intra-coded macroblocks;

(2) Store $W_i[w][v][u]$ and compute quant$_{i+1}$=quantizer_scale$_{i+1}$−quantizer_scale$_i$.

The inverse quantization process can be simplified as follows for the (i+1)-th macroblock:

```
if (quant_{i+1} == 1 || quant_{i+1} == −1)
for (v = 0; v < 8; v++) {
    for (u = 0; u < 8; u++) {
        if (QF_{i+l}[v][u] == 0)
            F''_{i+l}[v][u] = 0;
        else if ((u == 0) && (v == 0) && (macroblock_intra)) {
            F''_{i+l}[v][u] = dc_scaler * Qf_{i+l}[v][u];
        } else {
            if (macroblock_intra) {
                W_{i+l}[0][v][u] = (quant_{i+l} > 0)? W_i[0][v][u] + W[0][v][u] : W_i[0][v][u] − W[0][v][u];
                F''_{i+l}[v][u] = (QF_{i+l}[v][u] * W_{i+l}[0][v][u] * 2)/32;
            } else {
                W_{i+l}[1][v][u] = (quant_{i+l} > 0)? W_i[1][v][u] + W[1][v][u] : W_i[1][v][u] − W[1][v][u];
                F''_{i+l}[v][u] = (((QF_{i+l}[v][u] * 2) + Sign(QF_{i+l}[v][u])) * W_{i+l}[l][v][u])/32;
            }
        }
    }
}
else if (quant_{i+1} == 2 || quant_{i+1} == −2)
for (v = 0; v < 8; v++){
    for (u = 0; u < 8; u++) {
```

-continued

```
            if (QF_{i+1}[v][u] == 0)
                F''_{i+1}[v][u] = 0;
            else if ((u == 0) && (v == 0) && (macroblock_intra)) {
                F''_{i+l}[v][u] = dc\_scaler * Qf_{i+l}[v][u];
            } else {
                if (macroblock_intra) {
                    W_{i+l}[0][v][u] = (quant_{i+l} > 0) ? W_i[0][v][u] + \overline{W}[0][v][u] : W_i[0][v][u] - \overline{W}[0][v][u];
                    F''_{i+l}[v][u] = (Qf_{i+l}[v][u] * W_{i+l}[0][v][u] * 2)/32;
                } else {
                    W_{i+l}[1][v][u] = (quant_{l=l} > 0) ? W_i[1][v][u] + \overline{W}[1][v][u] : W_i[1][v][u] - \overline{W}[1][v][u];
                    F''_{i+l}[v][u] = (((QF_{i+l}[v][u] * 2) + Sign(QF_{i+l}[v][u])) * W_{i+l}[1][v][u])/32;
                }
            }
        }
    }
}
else {
    for (v = 0; v < 8; v++) {
        for (u = 0; u < 8; u++) {
            if (QF_{i+l}[v][u] == 0)
                F''_{i+l}[v][u] = 0;
            else if ((u == 0) && (v == 0) && (macroblock_intra)) {
                F''_{i+l}[v][u] = dc\_scaler * Qf_{i+l}[v][u];
            } else {
                if (macroblock_intra) {
                    W_{i+l}[0][v][u] = W_i[0][v][u];
                    F''_{i+l}[v][u] = (QF_{i+l}[v][u] * W_{i+l}[0][v][u] * 2)/32;
                } else {
                    W_{i+l}[1][v][u] = W_i[1][v][u];
                    F''_{i+l}[v][u] = (((QF_{i+l}[v][u] * 2) + Sign(QF_{i+l}[v][u])) * W_{i+l}[1][v][u])/32;
                }
            }
        }
    }
}
```

Figure 4:
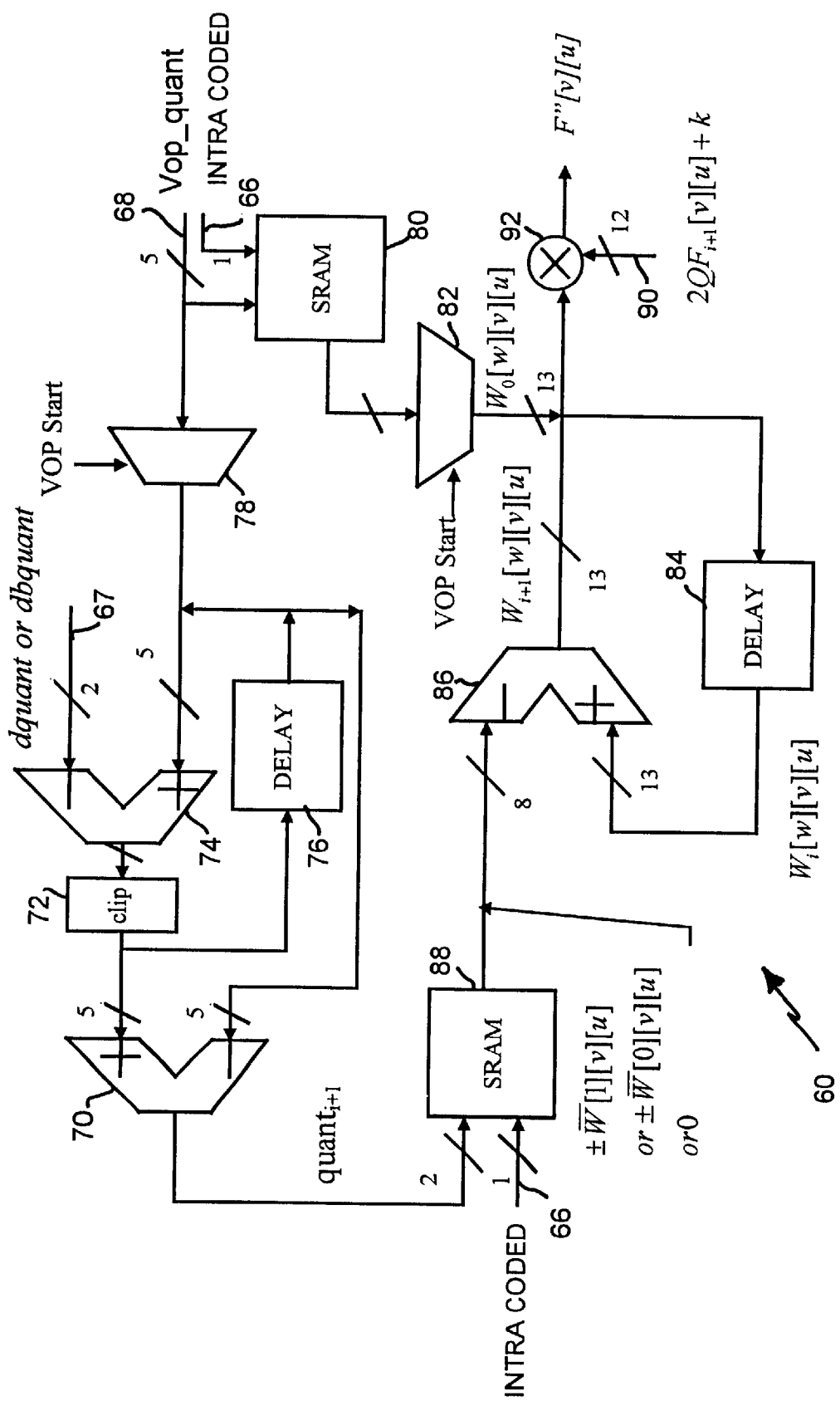
FIG. 4 is a schematic diagram of an example embodiment of the inverse quantization arithmetic function of FIG. 3.

A corresponding inverse quantization block diagram is shown in FIG. 4. A key step in the inverse quantization is to replace W[w][v][u]*quantiser_scale by a macroblock-based summation process.

In the embodiment of FIG. 4, the two-dimensional array of coefficients, scaled as $2QF_{i+1}[v][u]+k$, is input via line 90 (corresponding to line 90 in FIG. 3) to the inverse quantization arithmetic generally designated 60. In particular, the array of coefficients are provided to a multiplier 92 that also receives the output $W_{i+1}[w][v][u]$ from adder 86. The inputs to adder 86 comprise the output of a SRAM 88 (described hereinafter) and $W_i[w][v][u]$, which results after a delay 84 is applied to the initial weight $W_0[w][v][u]$ of each VOP. The term $W_0[w][v][u]$ is provided from static random access memory (SRAM) 80 at the beginning of each VOP (i.e., at the first macroblock of each VOP), in response to a VOP Start control signal input to switch 82.

SRAM 80 is addressed by the initial quantization level (Vop_quant) of each VOP and by a macroblock type identifier (INTRA CODED) that specifies whether the current macroblock is an intra-coded or non-intra-coded type macroblock. The Vop_quant and INTRA CODED input signals are provided to SRAM 80 on lines 68, 66 respectively. Vop_quant is carried in the VOP header. The INTRA CODED signal can simply comprise a control bit that identifies an intra-coded block when set, e.g., to "1" and a non-intra-coded block when set, e.g., to "0." When this bit is set, a special page is pointed to within the SRAM, enabling the SRAM to output data (i.e., a current weighting) required to process the intra-coded block.

The Vop_quant is also provided to switch 78, which is actuated by the control signal VOP Start at the commencement of each VOP. The Vop_quant data are summed with dquant or dbquant data provided to an adder 74 via line 67. The resultant sum comprises quant_scale_code (the current macroblock quantization level) and is clipped by function 72 as described above. The clipped data are delayed by delay 76 and fed back to the + input of adder 74. Thus, adder 74 receives Vop_quant via switch 78 at the beginning of each VOP, and then receives subsequent feedback data instead of the initial Vop_quant for each subsequent cycle (during which time switch 78 is open). The delayed, clipped data from delay 76 are also summed in adder 70 with the current clipped data from clip function 72. This produces a next quantization difference (quant$_{i+1}$), which is provided to SRAM 88 as an address input to cause SRAM 88 to provide adder 86 with the next array of weights from the appropriate weighting matrix:

±$\overline{W}$[1][v][u]

or ±$\overline{W}$[0][v][u]

or 0.

SRAM 88 is also addressed by the INTRA CODED signal via line 66 to identify intra-coded blocks as described above in connection with SRAM 80. The ultimate output of the inverse quantization arithmetic of FIG. 4 is F"[v][u] which is output from the multiplier 92 for processing by the saturation function 62 of FIG. 3.

As can be seen from FIG. 4, only a single multiplier 92 is required. This represents a significant improvement over prior art inverse quantizers, which require at least two multipliers at much greater expense than the quantizer of the present invention.

Although the invention has been described in connection with various specific embodiments, those skilled in the art will appreciate that numerous adaptations and modifications may be made thereto without departing from the scope of the invention as set forth in the claims.

What is claimed is:

1. A method for inverse quantization of coefficients comprising the steps of:

providing a two-dimensional array of quantized coefficients QF[v][u] to be inverse quantized; said coefficient representing video macroblocks pre-computing and storing a first weighting matrix $\overline{W}$[0][v][u]=2*W[0][v][u] for intra-coded macroblocks represented by said coefficients;

pre-computing and storing a second weighting matrix $\overline{W}$[1][v][u]=2*W[1][v][u] for non-intra-coded macroblocks represented by said coefficients;

computing a quantization difference to be used in selecting a weight factor based on a current macroblock quantization level;

providing said weight factor from one of said stored first and second weighting matrices in response to said quantization difference and a macroblock type identifier; and iteratively computing subsequent weights $W_{i+1}$[w][v][u] from a current weight $W_i$[w][v][u] and said weight factor.

2. A method in accordance with claim 1 comprising the further step of:

multiplying said array of coefficients QF[v][u] by said weights $W_{i+1}$[w][v][u] to reconstruct unquantized coefficients.

3. A method in accordance with claim 2 wherein said coefficients represent macroblocks of a video object plane (VOP).

4. A method in accordance with claim 1 wherein said quantization difference is computed by subtracting a first quantizer scale (quantizer_scale$_i$) from a second, subsequent quantizer scale (quantizer_scale$_{i+1}$).

5. Apparatus for inverse quantizing a two-dimensional array of quantized coefficients QF[v][u], comprising:

a stored pre-computed first weighting matrix $\overline{W}$[0][v][u]=2*W[0][v][u] for intra-coded macroblocks represented by said coefficients;

a stored pre-computed second weighting matrix $\overline{W}$[1][v][u]=2*W[1][v][u] for non-intra-coded macroblocks represented by said coefficients;

a first adder adapted to compute a quantization difference to be used in selecting a weight factor based on a current macroblock quantization level;

at least one of said stored first and second weighting matrices being responsive to said quantization difference and a macroblock type identifier for providing said weight factor; and a second adder for iteratively computing subsequent weights $W_{i+1}$[w][v][u] from a current weight $W_i$[w][v][u] and said weight factor.

6. Apparatus in accordance with claim 5 further comprising a multiplier for multiplying said array of coefficients QF[v][u] by said weights $W_{i+1}$[w][v][u] to reconstruct unquantized coefficients.

7. Apparatus in accordance with claim 6 wherein said coefficients represent macroblocks of a video object plane (VOP).

8. Apparatus in accordance with claim 7 wherein said pre-computed first and second weighting matrices are stored in a first random access memory (RAM) addressed by said quantization difference and said macroblock type identifier.

9. Apparatus in accordance with claim 8 wherein an initial weight $W_0$[w][v][u] for each VOP is stored in a second RAM and provided to said second adder as $W_i$[w][v][u] via a delay.

10. Apparatus in accordance with claim 9 wherein said second RAM is addressed by an initial quantization level (Vop_quant) of each VOP and said macroblock type identifier.

11. Apparatus in accordance with claim 9 further comprising a switch for providing said initial weight $W_0$[w][v][u] for each VOP from said second RAM to said delay only at the commencement of each new VOP.

12. Apparatus in accordance with claim 5 wherein said pre-computed first and second weighting matrices are stored in a random access memory (RAM) addressed by said quantization difference and said macroblock type identifier.

13. Apparatus in accordance with claim 12 further comprising a multiplier for multiplying said array of coefficients QF[v][u] by said weights $W_{i+1}$[w][v][u] to reconstruct unquantized coefficients.

* * * * *